United States Patent
Lenahan

(10) Patent No.: US 7,703,057 B2
(45) Date of Patent: Apr. 20, 2010

(54) SYSTEMS AND METHODS TO DETERMINE GROUND CAPACITANCES OF NON-FLOATING NETS

(75) Inventor: Terrence A. Lenahan, Holly Springs, NC (US)

(73) Assignee: Cadence Design Systems, Inc., San Jose, CA (US)

( * ) Notice: Subject to any disclaimer, the term of this patent is extended or adjusted under 35 U.S.C. 154(b) by 179 days.

(21) Appl. No.: 11/522,646

(22) Filed: Sep. 18, 2006

(65) Prior Publication Data

US 2008/0072192 A1    Mar. 20, 2008

(51) Int. Cl.
*G06F 17/50* (2006.01)
(52) U.S. Cl. .................. 716/5; 716/2; 716/4; 716/6
(58) Field of Classification Search .......... 716/2, 716/4–6
See application file for complete search history.

(56) References Cited

U.S. PATENT DOCUMENTS

| 6,061,508 A * | 5/2000 | Mehrotra et al. ........... 716/6 |
| 6,353,917 B1 * | 3/2002 | Muddu et al. .............. 716/6 |
| 2005/0248022 A1 * | 11/2005 | Badr et al. ................ 257/690 |
| 2006/0036984 A1 | 2/2006 | Mukaihira |

* cited by examiner

*Primary Examiner*—Vuthe Siek
(74) *Attorney, Agent, or Firm*—Holland & Knight LLP

(57) ABSTRACT

Some aspects provide determination of mutual capacitances among a plurality of floating nets and a plurality of non-floating nets, determination of a self-capacitance of each of the plurality of non-floating nets based on the mutual capacitances, and, for each of the plurality of non-floating nets, association of a ground capacitance with a non-floating net that is substantially equal to a determined self-capacitance of the non-floating net. Aspects may further provide performance of a timing study of a capacitor network including the plurality of non-floating nets using the ground capacitance determined for each of the plurality of non-floating nets.

13 Claims, 13 Drawing Sheets

300 ↘

| | NF1 | NF2 | NF3 | NF4 | NF5 | NF6 | NF7 | NF8 | NF9 | NF10 |
|---|---|---|---|---|---|---|---|---|---|---|
| NF1 | $C_{11}$ | | | | | | | | | |
| NF2 | | $C_{22}$ | | | | | | | | |
| NF3 | | | $C_{33}$ | | | | | | | |
| NF4 | | | | $C_{44}$ | | | | | | |
| NF5 | | | | | $C_{55}$ | | | | | |
| NF6 | | | | | | $C_{66}$ | | | | |
| NF7 | | | | | | | $C_{77}$ | | | |
| NF8 | | | | | | | | $C_{88}$ | | |
| NF9 | | | | | | | | | $C_{99}$ | |
| NF10 | | | | | | | | | | $C_{1010}$ |

FIG. 3

| Cluster | Global Net Ref. | Floating? | Cluster Net Ref. |
|---|---|---|---|
| 1 | PIN_16_GND | N | NF1 |
| 1 | PIN_17_VCC | N | NF2 |
| 1 | FILL_AA_3 | Y | F1 |
| 1 | FILL_AA_3 | Y | F2 |
| 1 | IND_10_OUT+ | N | NF3 |
| 1 | I/O_DATA_14 | N | NF4 |
| 1 | IND_10_OUT- | N | NF5 |
| 1 | FILL_AA_3 | Y | F3 |
| 1 | I/O_DATA_15 | N | NF6 |
| 1 | FILL_Q_2 | Y | F4 |
| 1 | I/O_DATA_16 | N | NF7 |
| 1 | PWR_TX_3 | N | NF8 |
| 1 | FILL_AA_7 | Y | F5 |
| 1 | GND_TX_3 | N | NF9 |
| 1 | PWR_RX_3 | N | NF10 |
| 1 | FILL_ZZ_1 | Y | F6 |
| 1 | FILL_ZZ_2 | Y | F7 |

Matrix C1 (Cluster 1)

|  | NF1 | NF2 | NF3 | NF4 | NF5 | NF6 | NF7 | NF8 | NF9 | NF10 |
|---|---|---|---|---|---|---|---|---|---|---|
| NF1 | $C^1_{11}$ | $C^1_{12}$ | $C^1_{13}$ | $C^1_{14}$ | $C^1_{15}$ | $C^1_{16}$ | $C^1_{17}$ | $C^1_{18}$ | $C^1_{19}$ | $C^1_{110}$ |
| NF2 | $C^1_{21}$ | $C^1_{22}$ | $C^1_{23}$ | $C^1_{24}$ | $C^1_{25}$ | $C^1_{26}$ | $C^1_{27}$ | $C^1_{28}$ | $C^1_{29}$ | $C^1_{210}$ |
| NF3 | $C^1_{31}$ | $C^1_{32}$ | $C^1_{33}$ | $C^1_{34}$ | $C^1_{35}$ | $C^1_{36}$ | $C^1_{37}$ | $C^1_{38}$ | $C^1_{39}$ | $C^1_{310}$ |
| NF4 | $C^1_{41}$ | $C^1_{42}$ | $C^1_{43}$ | $C^1_{44}$ | $C^1_{45}$ | $C^1_{46}$ | $C^1_{47}$ | $C^1_{48}$ | $C^1_{49}$ | $C^1_{410}$ |
| NF5 | $C^1_{51}$ | $C^1_{52}$ | $C^1_{53}$ | $C^1_{54}$ | $C^1_{55}$ | $C^1_{56}$ | $C^1_{57}$ | $C^1_{58}$ | $C^1_{59}$ | $C^1_{510}$ |
| NF6 | $C^1_{61}$ | $C^1_{62}$ | $C^1_{63}$ | $C^1_{64}$ | $C^1_{65}$ | $C^1_{66}$ | $C^1_{67}$ | $C^1_{68}$ | $C^1_{69}$ | $C^1_{610}$ |
| NF7 | $C^1_{71}$ | $C^1_{72}$ | $C^1_{73}$ | $C^1_{74}$ | $C^1_{75}$ | $C^1_{76}$ | $C^1_{77}$ | $C^1_{78}$ | $C^1_{79}$ | $C^1_{710}$ |
| NF8 | $C^1_{81}$ | $C^1_{82}$ | $C^1_{83}$ | $C^1_{84}$ | $C^1_{85}$ | $C^1_{86}$ | $C^1_{87}$ | $C^1_{88}$ | $C^1_{89}$ | $C^1_{810}$ |
| NF9 | $C^1_{91}$ | $C^1_{92}$ | $C^1_{93}$ | $C^1_{94}$ | $C^1_{95}$ | $C^1_{96}$ | $C^1_{97}$ | $C^1_{98}$ | $C^1_{99}$ | $C^1_{910}$ |
| NF10 | $C^1_{101}$ | $C^1_{102}$ | $C^1_{103}$ | $C^1_{104}$ | $C^1_{105}$ | $C^1_{106}$ | $C^1_{107}$ | $C^1_{108}$ | $C^1_{109}$ | $C^1_{1010}$ |

FIG. 7

Matrix C2 (Cluster 1)

| | F1 | F2 | F3 | F4 | F5 | F6 | F7 |
|---|---|---|---|---|---|---|---|
| NF1 | $C^2_{11}$ | $C^2_{12}$ | $C^2_{13}$ | $C^2_{14}$ | $C^2_{15}$ | $C^2_{16}$ | $C^2_{17}$ |
| NF2 | $C^2_{21}$ | $C^2_{22}$ | $C^2_{23}$ | $C^2_{24}$ | $C^2_{25}$ | $C^2_{26}$ | $C^2_{27}$ |
| NF3 | $C^2_{31}$ | $C^2_{32}$ | $C^2_{33}$ | $C^2_{34}$ | $C^2_{35}$ | $C^2_{36}$ | $C^2_{37}$ |
| NF4 | $C^2_{41}$ | $C^2_{42}$ | $C^2_{43}$ | $C^2_{44}$ | $C^2_{45}$ | $C^2_{46}$ | $C^2_{47}$ |
| NF5 | $C^2_{51}$ | $C^2_{52}$ | $C^2_{53}$ | $C^2_{54}$ | $C^2_{55}$ | $C^2_{56}$ | $C^2_{57}$ |
| NF6 | $C^2_{61}$ | $C^2_{62}$ | $C^2_{63}$ | $C^2_{64}$ | $C^2_{65}$ | $C^2_{66}$ | $C^2_{67}$ |
| NF7 | $C^2_{71}$ | $C^2_{72}$ | $C^2_{73}$ | $C^2_{74}$ | $C^2_{75}$ | $C^2_{76}$ | $C^2_{77}$ |
| NF8 | $C^2_{81}$ | $C^2_{82}$ | $C^2_{83}$ | $C^2_{84}$ | $C^2_{85}$ | $C^2_{86}$ | $C^2_{87}$ |
| NF9 | $C^2_{91}$ | $C^2_{92}$ | $C^2_{93}$ | $C^2_{94}$ | $C^2_{95}$ | $C^2_{96}$ | $C^2_{97}$ |
| NF10 | $C^2_{101}$ | $C^2_{102}$ | $C^2_{103}$ | $C^2_{104}$ | $C^2_{105}$ | $C^2_{106}$ | $C^2_{107}$ |

FIG. 8

Matrix C3 (Cluster 1)

|    | F1 | F2 | F3 | F4 | F5 | F6 | F7 |
|----|----|----|----|----|----|----|----|
| F1 | $C^3_{11}$ | $C^3_{12}$ | $C^3_{13}$ | $C^3_{14}$ | $C^3_{15}$ | $C^3_{16}$ | $C^3_{17}$ |
| F2 | $C^3_{21}$ | $C^3_{22}$ | $C^3_{23}$ | $C^3_{24}$ | $C^3_{25}$ | $C^3_{26}$ | $C^3_{27}$ |
| F3 | $C^3_{31}$ | $C^3_{32}$ | $C^3_{33}$ | $C^3_{34}$ | $C^3_{35}$ | $C^3_{36}$ | $C^3_{37}$ |
| F4 | $C^3_{41}$ | $C^3_{42}$ | $C^3_{43}$ | $C^3_{44}$ | $C^3_{45}$ | $C^3_{46}$ | $C^3_{47}$ |
| F5 | $C^3_{51}$ | $C^3_{52}$ | $C^3_{53}$ | $C^3_{54}$ | $C^3_{55}$ | $C^3_{56}$ | $C^3_{57}$ |
| F6 | $C^3_{61}$ | $C^3_{62}$ | $C^3_{63}$ | $C^3_{64}$ | $C^3_{65}$ | $C^3_{66}$ | $C^3_{67}$ |
| F7 | $C^3_{71}$ | $C^3_{72}$ | $C^3_{73}$ | $C^3_{74}$ | $C^3_{75}$ | $C^3_{76}$ | $C^3_{77}$ |

FIG. 9

Matrix C_Reduced (Cluster 1)

|      | NF1 | NF2 | NF3 | NF4 | NF5 | NF6 | NF7 | NF8 | NF9 | NF10 |
|------|-----|-----|-----|-----|-----|-----|-----|-----|-----|------|
| NF1  | $C^r_{11}$ | | | | | | | | | |
| NF2  | | $C^r_{22}$ | | | | | | | | |
| NF3  | | | $C^r_{33}$ | | | | | | | |
| NF4  | | | | $C^r_{44}$ | | | | | | |
| NF5  | | | | | $C^r_{55}$ | | | | | |
| NF6  | | | | | | $C^r_{66}$ | | | | |
| NF7  | | | | | | | $C^r_{77}$ | | | |
| NF8  | | | | | | | | $C^r_{88}$ | | |
| NF9  | | | | | | | | | $C^r_{99}$ | |
| NF10 | | | | | | | | | | $C^r_{1010}$ |

FIG. 10

Matrix C_Reduced (Cluster 2)

|  | NF1 | NF2 | NF3 | NF4 | NF5 | NF6 | NF7 | NF8 |
|---|---|---|---|---|---|---|---|---|
| NF1 | $C^r_{11}$ | $C^r_{12}$ | $C^r_{13}$ | $C^r_{14}$ | $C^r_{15}$ | $C^r_{16}$ | $C^r_{17}$ | $C^r_{18}$ |
| NF2 | $C^r_{21}$ | $C^r_{22}$ | $C^r_{23}$ | $C^r_{24}$ | $C^r_{25}$ | $C^r_{26}$ | $C^r_{27}$ | $C^r_{28}$ |
| NF3 | $C^r_{31}$ | $C^r_{32}$ | $C^r_{33}$ | $C^r_{34}$ | $C^r_{35}$ | $C^r_{36}$ | $C^r_{37}$ | $C^r_{38}$ |
| NF4 | $C^r_{41}$ | $C^r_{42}$ | $C^r_{43}$ | $C^r_{44}$ | $C^r_{45}$ | $C^r_{46}$ | $C^r_{47}$ | $C^r_{48}$ |
| NF5 | $C^r_{51}$ | $C^r_{52}$ | $C^r_{53}$ | $C^r_{54}$ | $C^r_{55}$ | $C^r_{56}$ | $C^r_{57}$ | $C^r_{58}$ |
| NF6 | $C^r_{61}$ | $C^r_{62}$ | $C^r_{63}$ | $C^r_{64}$ | $C^r_{65}$ | $C^r_{66}$ | $C^r_{67}$ | $C^r_{68}$ |
| NF7 | $C^r_{71}$ | $C^r_{72}$ | $C^r_{73}$ | $C^r_{74}$ | $C^r_{75}$ | $C^r_{76}$ | $C^r_{77}$ | $C^r_{78}$ |
| NF8 | $C^r_{81}$ | $C^r_{82}$ | $C^r_{83}$ | $C^r_{84}$ | $C^r_{85}$ | $C^r_{86}$ | $C^r_{87}$ | $C^r_{88}$ |

FIG. 11

| Global Net Ref | $C_G$ ($\mu\Omega$) | Associated Global Net Ref. 1 | $C_{M1}$ ($\mu\Omega$) | Associated Global Net Ref. 2 | $C_{M2}$ ($\mu\Omega$) | Associated Global Net Ref. 3 | $C_{M3}$ ($\mu\Omega$) | Associated Global Net Ref. 4 | $C_{M4}$ ($\mu\Omega$) |
|---|---|---|---|---|---|---|---|---|---|
| | | | | | | | | | |
| | | | | | | | | | |
| | | | | | | | | | |

FIG. 12

SYSTEMS AND METHODS TO DETERMINE GROUND CAPACITANCES OF NON-FLOATING NETS

BACKGROUND

An electronic system typically employs conductive traces, or nets, to carry electrical signals between the elements thereof. For example, an integrated circuit die includes nets to carry signals between its integrated electronic devices, and an integrated circuit package substrate includes nets to carry signals between an integrated circuit die and other components coupled to a motherboard. A motherboard, in turn, includes nets for carrying electrical signals between the components coupled thereto.

Nets which terminate at a component, a power supply or ground are commonly known as non-floating nets. In contrast, floating nets comprise conductive traces or other conductive structures that are not thusly coupled. Floating nets may comprise metal fill deposited in and/or on a substrate in order to provide desired mechanical properties (e.g., integrity, layer planarity, stiffness, strength, etc.). Floating nets may also comprise other uncoupled conductors or artifacts of a manufacturing process.

Floating and non-floating nets of an electronic system are typically taken into account during simulations or other studies of the system. For example, a system designer may consider the effects of mutual capacitances among floating and non-floating nets when analyzing the performance of an electronic system. According to some system analysis techniques, the above-described mutual capacitances as well as the ground capacitance of each net are used to generate a network of capacitors. The capacitor network is then converted to a "reduced" capacitor network that does not include mutual or ground capacitances associated with floating nets. The reduced capacitor network may be used to conduct various studies, including but not limited to timing studies.

According to one technique for reducing such a capacitor network, a capacitance matrix is determined that associates each non-floating net with each other non-floating net. The capacitance matrix takes into account mutual capacitances between each floating net and each non-floating net, as well as mutual capacitances between each floating net and each other floating net. As is known in the art, the sum of all capacitances in a row of the capacitance matrix is equal to a ground capacitance of a non-floating net associated with the row. Each capacitance in the row (except for the self-capacitance located on the leading diagonal) is equal to a mutual capacitance between the associated non-floating net and another non-floating net. The capacitance matrix may therefore be used to create a reduced network including capacitors between each non-floating net and ground (i.e., ground capacitors), and capacitors between each non-floating net and each other non-floating net. However, this capacitor network reduction technique is particularly resource-consuming if the system under analysis includes a large number of non-floating nets.

Some network reduction techniques are designed to specifically deal with large numbers of non-floating nets. According to some of these techniques, a mutual capacitance between a non-floating net and a floating net is converted to a capacitor between the non-floating net and ground, with the capacitor having a value equal to the mutual capacitance multiplied by a "decoupling factor" (e.g., 0.5). Mutual capacitances between floating nets, on the other hand, are ignored and therefore do not impact the reduced capacitor network resulting from these techniques. The resulting reduced capacitor network can be unsuitably inaccurate for some uses.

BRIEF DESCRIPTION OF THE DRAWINGS

FIG. 3 is an illustration of a capacitance matrix according to some embodiments.

FIG. 7 is an illustration of a capacitance matrix according to some embodiments.

FIG. 8 is an illustration of a capacitance matrix according to some embodiments.

FIG. 9 is an illustration of a capacitance matrix according to some embodiments.

FIG. 10 is an illustration of a capacitance matrix of a reduced capacitor network according to some embodiments.

FIG. 11 is an illustration of a capacitance matrix of a reduced capacitor network according to some embodiments.

FIG. 12 is a tabular representation of a portion of a netlist according to some embodiments.

DETAILED DESCRIPTION

Figure 1:
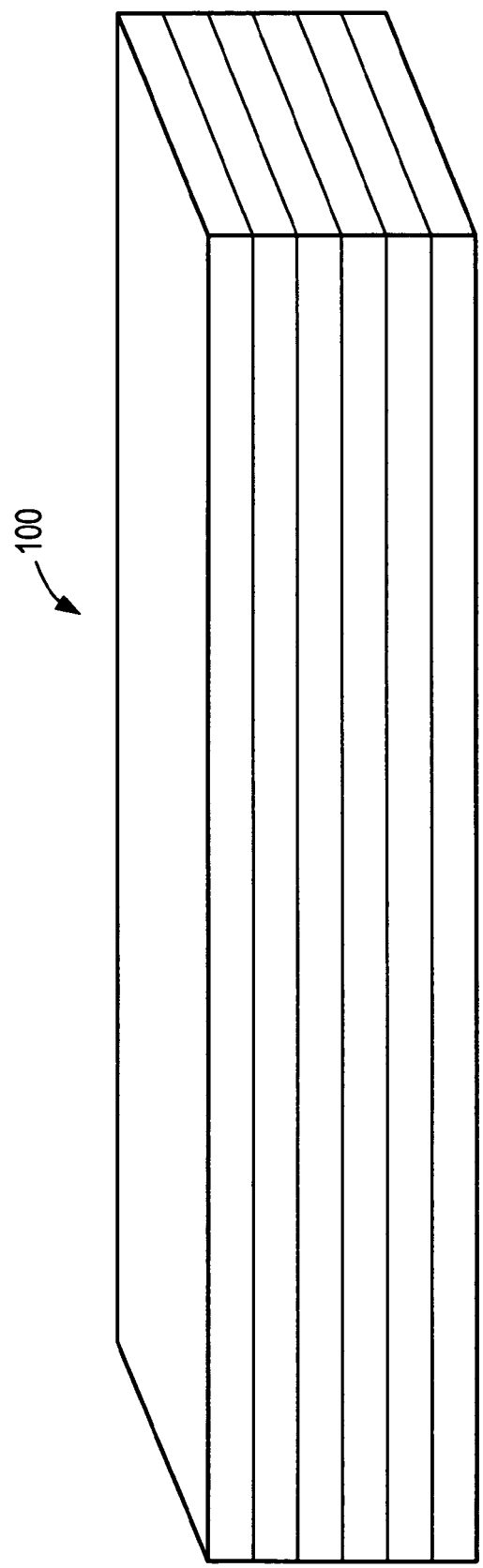
FIG. 1 is a cross-sectional side view of a substrate according to some embodiments.

FIG. 1 is a cross-sectional side view of substrate 100 according to some embodiments. Substrate 100 may comprise all or a portion of an integrated circuit die, an integrated circuit package substrate, a printed circuit board, or any other suitable substrate that is or becomes known. Substrate 100 includes layers of non-floating nets and floating nets. One or more of the illustrated layers may also or alternatively include integrated and/or discrete electrical components.

According to some embodiments, substrate 100 includes metallization layers separated by dielectric layers. Any suitable conductive material(s) or dielectric material(s) may be employed. A first portion of a net located in a first metallization layer may be coupled to a second portion of the net located in a second metallization layer by a conductive via passing through an intermediate dielectric layer. One or more layers of substrate 100 may comprise a continuous conductive plane coupled to ground (i.e., a ground plane) or to a supply voltage.

As described above, the operation of a system including substrate 100 may be affected by mutual capacitances among the floating and non-floating nets of substrate 100. These mutual capacitances as well as the ground capacitance of each net may be represented by a network of capacitors coupled between the nets (i.e., mutual capacitances) and between each net and ground (i.e., ground capacitances). The network may be used to model and study the operation of the system including substrate 100.

Figure 2:
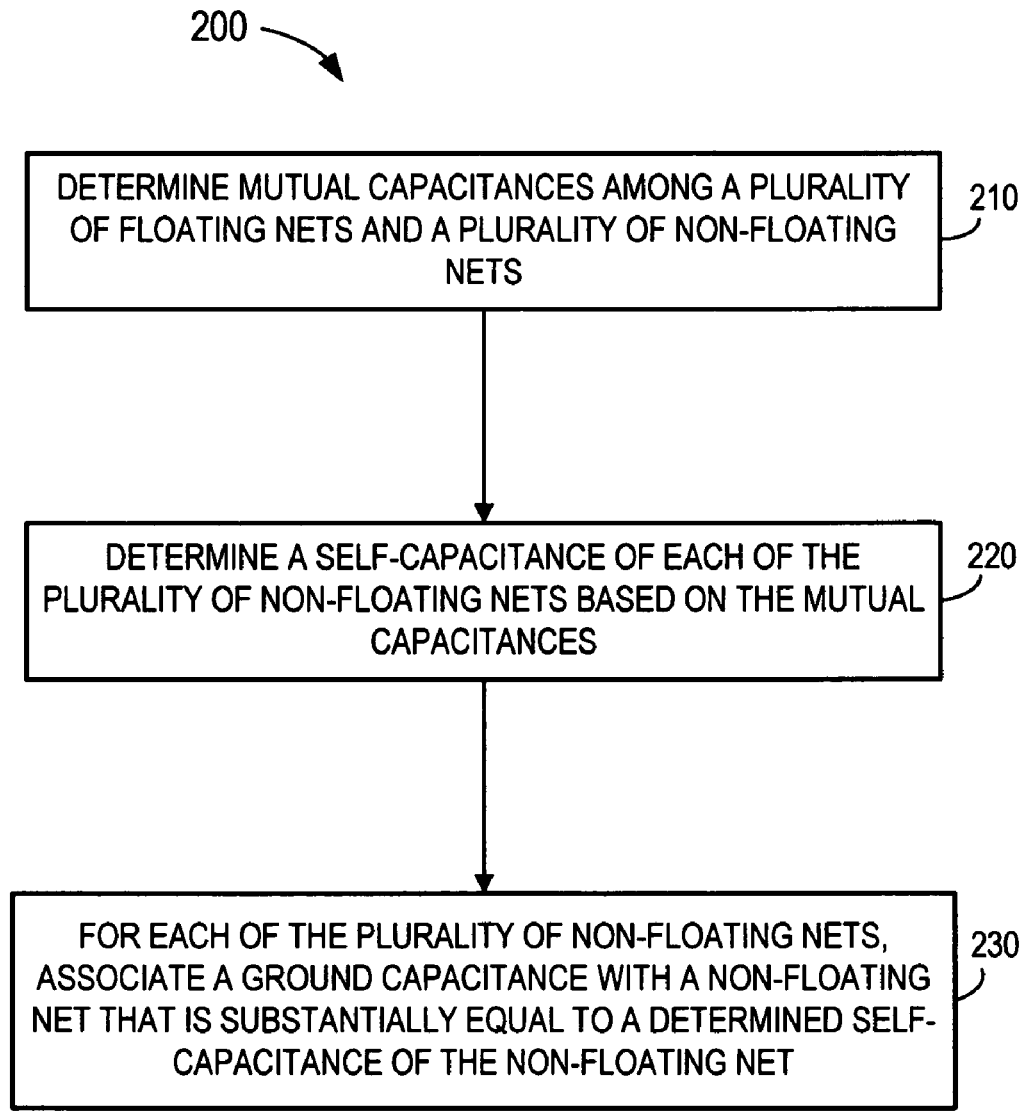
FIG. 2 is a flow diagram according to some embodiments.

FIG. 2 illustrates a flow diagram of process 200 to determine a reduced capacitor network according to some embodiments. Process 200 and the other processes described herein may be executed by any combination of hardware, software and/or manual implementations. For example, the processes may be executed by a microprocessor executing processor-executable program code of a software application.

Initially, at 210, mutual capacitances are determined among a plurality of floating nets and a plurality of non-floating nets. According to some embodiments, a layout record associated with an electronic circuit is analyzed to determine mutual capacitances between each non-floating net and each other non-floating net, between each non-floating net and each floating net, and between each floating net and each other floating net. Some embodiments utilize known techniques based on pattern matching, field solving, and/or fast multipole algorithms to determine the mutual capacitances.

A self-capacitance of each of the plurality of non-floating nets is determined at 220 based on the above-determined mutual capacitances. According to some embodiments of 220, a first capacitance matrix C1 is created based on the mutual capacitances between each non-floating net and each other non-floating net, a second capacitance matrix C2 is created based on the mutual capacitances between each non-floating net and each floating net, and a third capacitance matrix C3 is created based on the mutual capacitances between each floating net and each other floating net. Next, leading diagonal entries of a "reduced" matrix C_red are determined, wherein C_red=C1-transpose(C2)*inverse(C3)*C2. Determination of matrices C1, C2 and C3 and the leading diagonal entries according to some embodiments will be described in detail below.

As described above, the leading diagonal entries represent self-capacitances of the non-floating nets. FIG. 3 illustrates reduced matrix 300 according to some embodiments. Matrix 300 includes leading diagonal entries indicating a self-capacitance of each of non-floating nets NF1 through NF10. These self-capacitances, as mentioned above, were determined at 220 based on mutual capacitances among a plurality of floating nets and non-floating nets NF1 through NF10.

Next, at 230, a ground capacitance is associated with each of the plurality of non-floating nets. The ground capacitance associated with a particular non-floating net is substantially equal to a determined self-capacitance of the particular non-floating net. With reference to the FIG. 3 example, a ground capacitance substantially equal to $C_{66}$ is associated with non-floating net NF6 in some embodiments of 230.

A ground capacitance may be associated with a non-floating net at 230 by including the ground capacitance in a database record associated with the non-floating net. In some embodiments, a netlist is updated at 230 to associate the ground capacitances with respective non-floating nets. Some embodiments of process 200 may thereby efficiently provide a decoupled capacitor network that is suitable for use in timing studies or other analysis. Some timing studies use RC time constants based on the determined ground capacitances and on the resistance values of the non-floating nets associated with the ground capacitances.

Figure 4:
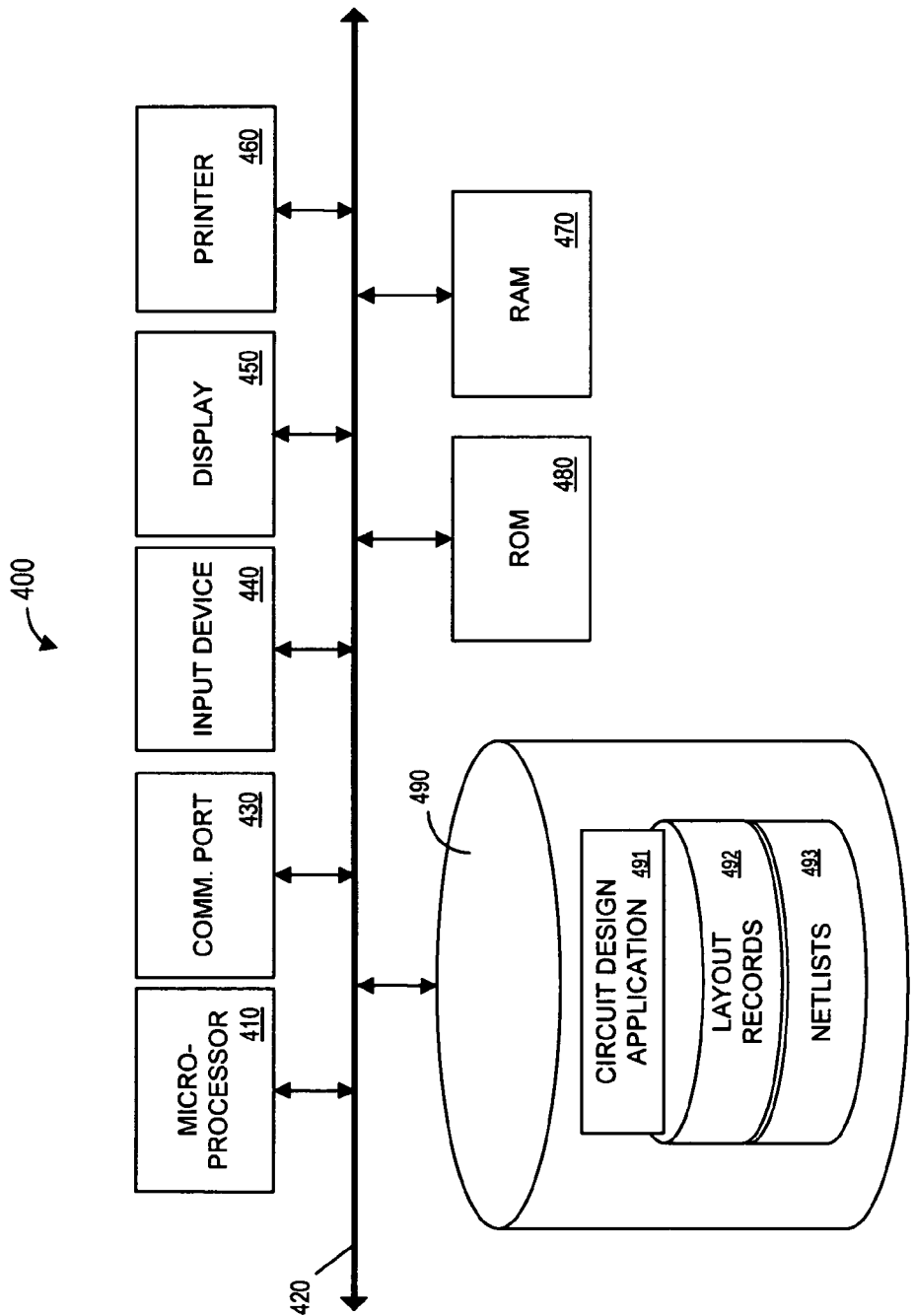
FIG. 4 is a block diagram of a computer system according to some embodiments.

FIG. 4 is a block diagram of an internal architecture of computer system 400 according to some embodiments of the invention. Computer system 400 may be used to execute processes such as those described herein. Computer system 400 may also or alternatively store data used in performance of these processes. Computer system 400 may comprise a desktop computer system.

Computer system 400 includes microprocessor 410 in communication with communication bus 420. Microprocessor 410 may comprise a RISC-based or other type of processor. Microprocessor 410 executes program code to control the elements of computer system 400 to provide desired functionality.

Also in communication with communication bus 420 is communication port 430. Communication port 430 may be used to transmit data to and to receive data from devices external to computer system 400. Communication port 430 is therefore preferably configured with hardware suitable to physically interface with desired external devices and/or network connections. For example, communication port 430 may comprise an Ethernet connection to a local area network through which computer system 400 may receive layout records and/or netlists from a layout design workstation.

Input device 440, display 450 and printer 460 are also in communication with communication bus 420. Any known input device may comprise input device 440, including a keyboard, mouse, touch pad, voice-recognition system, or any combination of these devices. As mentioned above, information may also be input to computer system 400 from other devices via communication port 430. Display 450 may be an integral or separate CRT display, flat-panel display or the like used to display graphics and text in response to commands issued by microprocessor 410. Printer 460 may also present text and graphics to an operator, but in hardcopy form using ink-jet, thermal, dot-matrix, laser, or other printing technologies.

RAM 470 is connected to communication bus 420 to provide microprocessor 410 with fast data storage and retrieval. In this regard, processor-executable code being executed by microprocessor 410 is typically stored temporarily in RAM 470 and executed therefrom by microprocessor 410. Any suitable random access memory may be used as RAM 470. ROM 480, in contrast, provides storage from which data can be retrieved but to which data cannot be stored. Accordingly, ROM 480 may be used to store invariant process steps and other data, such as basic input/output instructions and data used during boot-up of computer system 400 or to control communication port 430.

Data storage device 490 stores, among other data, processor-executable code of circuit design application 491. Microprocessor 410 therefore executes the code of circuit design application 491 in order to control computer system 400 to determine a reduced decoupled capacitor network according to some embodiments.

The program code of circuit design application 491 may be read from a computer-readable medium, such as a floppy disk, a CD-ROM, a DVD-ROM, a Zip™ disk, a magnetic tape, or a signal encoding the process steps, and then stored in data storage device 490 in a compressed, uncompiled and/or encrypted format. In alternative embodiments, hard-wired circuitry may be used in place of, or in combination with, processor-executable code for implementation of processes according to some embodiments. Thus, embodiments are not limited to any specific combination of hardware and software.

Circuit design application 491 may utilize information stored in layout records 492. This information may include details of circuit layouts to be evaluated using circuit design application 491. For example, layout records 492 may include information regarding net locations, net geometries, device locations, pin locations, dielectric layer thicknesses, and the like.

Netlists 493 are also stored in data storage device 490. Netlists 493 may specify values of electrical devices (e.g., resistors, diodes, inductors, capacitors) within a circuit and interconnections therebetween. Netlists 493 may also indicate how nets within the circuit are coupled to the devices, and capacitances between pairs of nets.

Also stored in data storage device 490 may also be other unshown elements that may be necessary for operation of computer system 400, such as an operating system, a database management system, and "device drivers" for allowing microprocessor 410 to interface with other elements of computer system 400. Data storage device 490 may also include other applications and other data files to provide functionality such as Web browsing, calendaring, e-mail access, word processing, accounting, presentation development and the like. These elements are known to those in the art, and are therefore not described in detail herein.

Figure 5A:
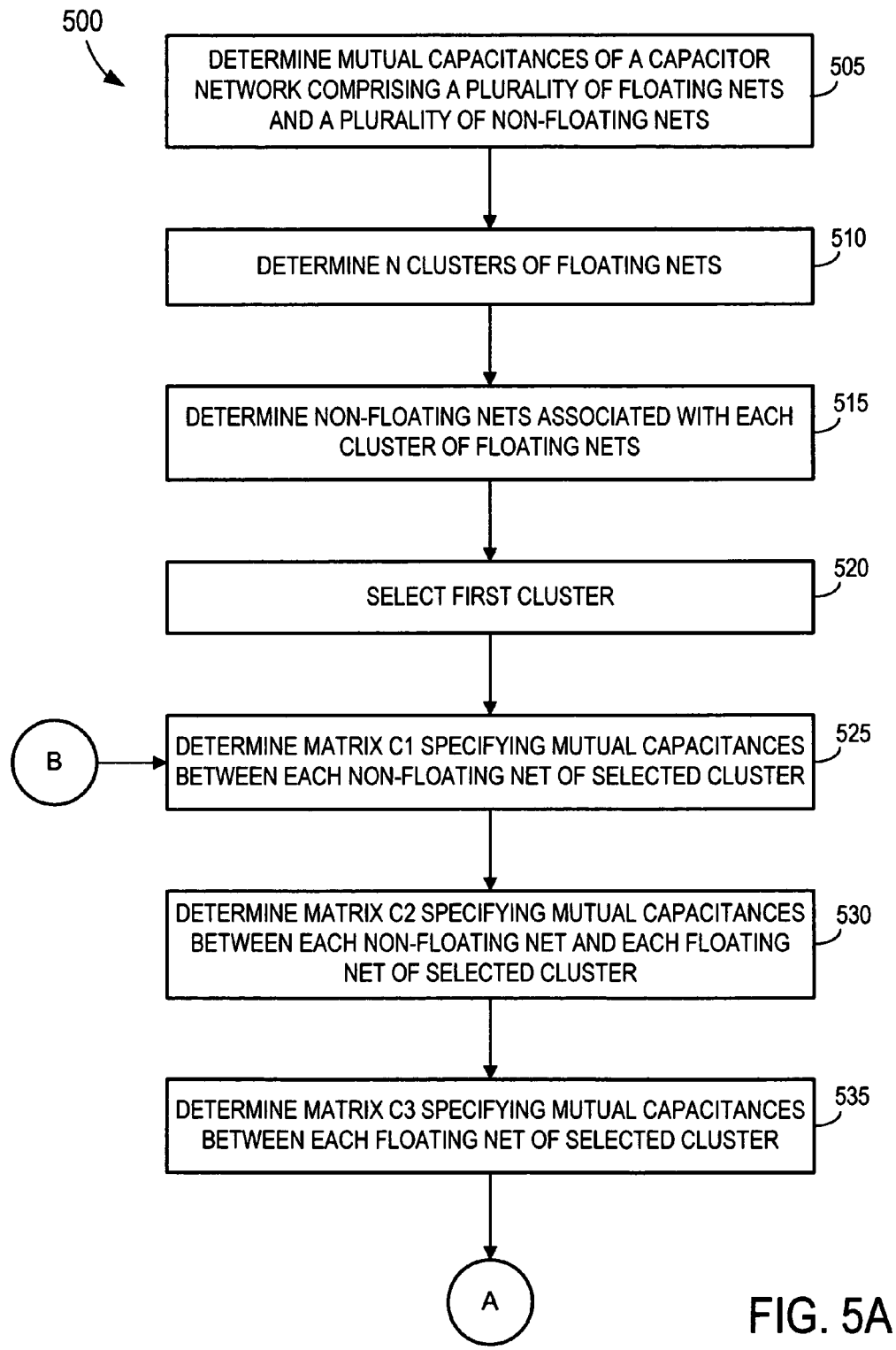
FIGS. 5A and 5B comprise a flow diagram according to some embodiments.
Figure 5B:
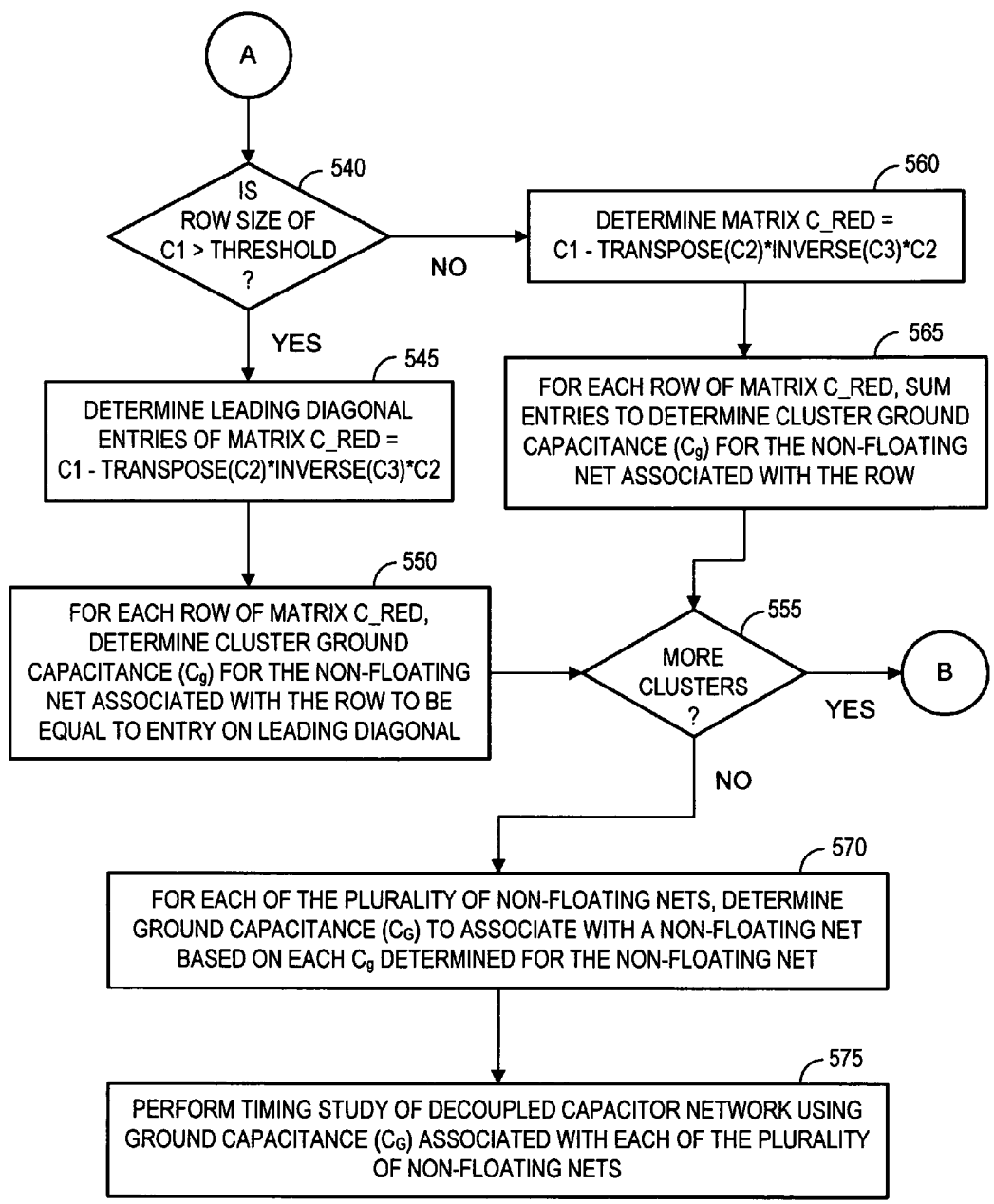

FIGS. 5A and 5B comprise a flow diagram of process 500 to determine a reduced capacitor network according to some embodiments. In some embodiments, process 500 is embodied in program code of circuit design application 491 and executed by microprocessor 410 of computer system 400.

Mutual capacitances of a capacitor network are determined at 505. The capacitor network comprises a plurality of floating nets and a plurality of non-floating nets. In some embodiments of 505, a plurality of floating nets and a plurality of non-floating nets are determined from a layout record of layout records 492. Mutual capacitances are then determined between each non-floating net and each other non-floating net, between each non-floating net and each floating net, and between each floating net and each other floating net. The determined capacitances may be stored within capacitance records of netlists 493.

The capacitances may be determined using extraction software employing a field solver, pattern matching, and/or any other system that is or becomes known. Generally, a field solver may determine the total charge on the nets due to voltages imposed thereon. The capacitances are then determined based on the total charge. The field solver may act upon the entire circuit of interest or portions thereof. Pattern matching, in contrast, may comprise comparing shapes of nets as specified in a layout record against two-dimensional and/or three-dimensional reference patterns. Mutual capacitances among the nets are determined based on stored capacitance values associated with the reference patterns.

N clusters of floating nets are determined at 510. Each floating net in a cluster of floating nets has a zero or negligible capacitive coupling to each floating net that is not a member of the cluster. Accordingly, the N clusters may be determined based on the mutual capacitances determined at 505.

Next, at 515, non-floating nets associated with each cluster are determined. A non-floating net associated with a cluster is non-negligibly coupled to at least one floating net of the cluster by a parasitic capacitance. According to some embodiments, a non-floating net may be associated with more than one cluster.

Figure 6:
FIG. 6 is a tabular representation of a portion of a data structure according to some embodiments.

Data structure 600 of FIG. 6 defines a cluster of floating nets and non-floating nets associated with the cluster according to some embodiments. As shown, each record of data structure 600 specifies a cluster with which the record is associated, a global net reference identifying a net from a layout record, a flag indicating whether the net is a floating net, and a net reference specific to the cluster. As shown, each non-floating net of the cluster is numbered consecutively and each floating net of the cluster is also numbered consecutively and independently from the non-floating nets. Data structure 600 includes records associated with a single cluster (i.e., Cluster 1) but may include records associated with some or all of the N clusters determined at 510.

A first cluster is selected at 520. For purposes of the present example, it will be assumed that Cluster 1 of data structure 600 is selected at 520. A matrix C1 is determined at 525. The matrix C1 specifies mutual capacitances between each non-floating net and each other non-floating net of the selected cluster.

FIG. 7 shows matrix C1 for Cluster 1 according to some embodiments. Matrix C1 specifies mutual capacitances between each non-floating net NF1 through NF10 of Cluster 1 and each other non-floating net NF1 through NF10 of Cluster 1. The mutual capacitances may be extracted from the capacitance records populated at 505. Matrix C1 is considered symmetric because $C^1_{ij}=C^1_{ji}$.

Similarly, at 530, a matrix C2 is determined specifying mutual capacitances between each non-floating net and each floating net of the selected cluster. Matrix C2 of FIG. 8 illustrates a matrix determined at 530 according to some embodiments. As shown, Matrix C2 specifies mutual capacitances between each non-floating net NF1 through NF10 of Cluster 1 and each floating net F1 through F7 of Cluster 1. These mutual capacitances may also be extracted from the capacitance records populated at 505.

A matrix C3 specifying mutual capacitances between each floating net and each other floating net of the selected cluster is then determined at 535. FIG. 9 illustrates Matrix C3 determined according to some embodiments of 535. Matrix C3 specifies mutual capacitances between each floating net F1 through F7 of Cluster 1 and each other floating net F1 through F7 of Cluster 1. Since $C^3_{ij}=C^3_{ji}$, Matrix C3 is considered to be symmetric.

At 540, it is determined whether a number of rows of Matrix C1 exceeds a threshold. According to some embodiments, the number of rows of Matrix C1 is equal to the number of non-floating nets of the selected cluster. The value of the threshold may determine a degree to which the resulting capacitor network is decoupled. For example, a large threshold may result in the decoupling of relatively few clusters, while the remaining clusters will not be decoupled. A small threshold, on the other hand, may cause every cluster to be decoupled. The threshold may be hard-coded, user-definable, and/or circuit-dependent, and is equal to 1000 in some embodiments. The present example assumes that the threshold is nine.

Flow proceeds from 540 to 545 because the number of rows of Matrix C1 of FIG. 7 exceeds the threshold. Leading diagonal entries of reduced Matrix C_red are determined at 545. According to some embodiments, Matrix C_red equals C1−transpose(C2)*inverse(C3)*C2, wherein * signifies matrix multiplication. The leading diagonal entries specify self-capacitances of each non-floating net of the selected cluster.

In some embodiments of 545, the self-capacitance of non-floating net "j" is determined by representing the jth column of matrix C2 by a sparse vector X. Next, the matrix equation C3*Y=X is solved for vector Y using iterative methods such as the Conjugate Gradient technique or direct methods such as Lapack routines. A sparse matrix solver may exploit the sparse nature of matrix C3 to increase solving efficiency. The dot product of vectors X and Y is then determined, and the value C1(i, j)−Y dot X is stored in the jth position of an array $C_s$. Array $C_s$ will thereby include the self-capacitances of each non-floating net. Array $C_s$ can be used to populate the leading diagonal entries of Matrix C_red as shown in FIG. 10.

For each row of Matrix C_red, a ground capacitance $C_g$ is determined at 550. The determined ground capacitance is equal to the leading diagonal entry of the row corresponding to the non-floating net. Accordingly, the ground capacitance $C_g$ is equal to the value of array $C_s$ that corresponds to the non-floating net. In still other words, the determined ground capacitance $C_g$ is equal to the determined self-capacitance of the non-floating net. For example, and with reference to FIG. 10, the ground capacitance $C_g$ determined at 550 for non-floating net NF4 is equal to $C'_{44}$.

It is then determined whether more clusters exist at 555. If so, flow returns to 525 to determine a Matrix C1 for a next cluster. Flow proceeds through 525, 530, 535 and 540 as described above with respect to the next cluster. It will be assumed that Matrix C1 for the next cluster includes eight rows and that flow therefore proceeds from 540 to 560.

The full Matrix C_red is determined at 560. In some embodiments, Matrix C_red is equal to C1−transpose(C2)

*inverse(C3)*C2. In particular, C_red(i,j)=C1(i,j)−Y dot X, where X is a vector equal to the jth column of matrix C2, and C3*Y=Z, where Z is a vector equal to the ith column of matrix C2.

FIG. 11 illustrates Matrix C_red as determined at 560 for the next cluster according to some embodiments. In accordance with standard capacitance matrix conventions, the leading diagonal entries ($C'_{jj}$) of the FIG. 11 matrix reflect self-capacitances of the associated non-floating nets, and the other entries of a row indicate mutual capacitances between a non-floating net associated with the row and all other non-floating nets of the cluster. A particular Cluster Net Reference of FIG. 11 (e.g., NF1, NF2, . . . ) may be associated with a Global Net Reference that is different from a Global Net Reference associated with an identical Cluster Net Reference of FIG. 10. Accordingly, Cluster Net Reference NF3 of FIG. 11 may refer to a completely different non-floating net than Cluster Net Reference NF3 of FIG. 10, which refers to non-floating net IND_10_OUT+according to data structure 600.

Conversely, a non-floating net associated with a particular Global Net Reference may be associated with a Cluster Net Reference of FIG. 11 and with a different (or identical) Cluster Net Reference of FIG. 11. In this regard, and as mentioned above, a non-floating net may be associated with more than one cluster.

At 565, all entries in a row of Matrix C_red are summed to determine the ground capacitance of a non-floating net associated with the row. This determination is performed for each row of Matrix C_red to result in ground capacitances $C_g$ associated with each non-floating net of Matrix C_red.

Flow continues from 565 to 555 and to 570 if no additional clusters are to be analyzed. A ground capacitance CG is determined at 570 for each of the plurality of non-floating nets of the capacitor network. The determined ground capacitance $C_G$ for a non-floating net is based on each ground capacitance $C_g$ determined for the non-floating net during iterations of 550 and 565. In this regard, a separate ground capacitance $C_g$ is determined for a non-floating net for each cluster to which the non-floating net belongs. Three ground capacitances $C_g$ are determined for a non-floating net, for example, if the non-floating net belongs to three clusters. Moreover, the ground capacitance $C_G$ determined at 570 for the non-floating net may be equal to a sum of the three ground capacitances $C_g$.

According to some embodiments, each ground capacitance $C_g$ determined during iterations of 550 and 565 is stored in netlists 493 as ground capacitance $C_G$ in association with a Global Net Reference of a corresponding non-floating net. In a case that a Global Net Reference is already associated with a ground capacitance $C_G$, the ground capacitance $C_g$ to be stored may be added to the existing ground capacitance $C_G$ to generate a new ground capacitance $C_G$ associated with the Global Net Reference.

A timing study of a decoupled capacitor network is performed at 575 using the ground capacitance $C_G$ determined for each of the plurality of non-floating nets. The ground capacitance $C_G$ of each non-floating net may be stored in a capacitance record of netlists 493. A portion of netlists 493 including several capacitance records according to some embodiments is illustrated in FIG. 12.

According to the illustrated portion, each record associates a ground capacitance $C_G$ with a Global Net Reference of a non-floating net. Each record may also specify up to four other Global Net References and associated mutual capacitances $C_{MX}$. The other Global Net References refer to other non-floating nets, and the mutual capacitance $C_{MX}$ associated with one of the other non-floating nets indicates a mutual capacitance between the other non-floating net and the non-floating net to which the capacitance record pertains. Embodiments may allow for more than the illustrated four other Global Net References per capacitance record.

In some embodiments, the mutual capacitances $C_{MX}$ of a capacitance record correspond to entries of Matrices C_red that are determined at 560 and that are not located on the leading diagonal of such Matrices. Some embodiments of 575 therefore determine a decoupled capacitor network in which each non-floating net is coupled to ground by a capacitor having a capacitance $C_G$ determined for the non-floating net, and in which some or all of the non-floating nets are coupled to one or more other non-floating nets by capacitors having capacitances $C_{MX}$ that are determined during iterations of 560.

According to some embodiments of process 500, the floating nets are not separated into clusters and only steps 505, 525, 530, 535, 545, 550, 570 and 575 are performed. Such a situation may occur if only one cluster exists, if a capacitance matrix of all the floating nets and non-floating nets is dense (i.e., relatively few zeros) or if an operator simply chooses to process all the nets as a single cluster. These embodiments may therefore determine leading diagonal entries of a single Matrix C_red having rows associated with each of the plurality of non-floaters under consideration. The decoupled capacitor network resulting from these embodiments might not include any mutual capacitances between non-floating nets.

The several embodiments described herein are solely for the purpose of illustration. Embodiments may include any currently or hereafter-known versions of the elements described herein. Therefore, persons skilled in the art will recognize from this description that other embodiments may be practiced with various modifications and alterations.

What is claimed is:

1. A method for converting a capacitor network of an electronic circuit having floating nets and non-floating nets with mutual capacitances into a reduced capacitor matrix to represent the capacitor network in a computer storage device, comprising:

associating each of a first plurality of mutual capacitances with two of a plurality of non-floating nets in a first matrix C1 using a computer;

associating each of a second plurality of mutual capacitances with one of the plurality of non-floating nets and one of a plurality of floating nets in a second matrix C2 using a computer;

associating each of a third plurality of mutual capacitances in the electronic circuit with two of the plurality of floating nets in a third matrix C3 using a computer;

determining leading diagonal entries of a reduced capacitor matrix C_red for the electronic circuit using a computer, wherein reduced matrix C_red=first matrix C1-transpose (second matrix C2)*inverse(third matrix C3)*second matrix C2; and for each of the plurality of non-floating nets in the electronic circuit, associating a ground capacitance in the electronic circuit with a non-floating net in the electronic circuit that is substantially equal to an associated leading diagonal entry and to a determined self-capacitance of the non-floating net.

2. The method according to claim 1, further comprising:

determining the first plurality of mutual capacitances between each of the plurality of non-floating nets in the electronic circuit and each other of the plurality of non-floating nets in the electronic circuit;

determining the second plurality of mutual capacitances between each of the plurality of non-floating nets in the electronic circuit and each of the plurality of floating nets in the electronic circuit; and determining the third plurality of mutual capacitances between each of the plurality of floating nets in the electronic circuit and each. other of the plurality of floating nets in the electronic circuit.

3. The method according to claim 1, further comprising: determining that a row size of the first matrix C1 is greater than a threshold number.

4. The method according to claim 1, further comprising:
if the row size of the first matrix C1 is less than the threshold number, determining all entries of the reduced capacitor matrix C_red for the electronic circuit, the ground capacitance in the electronic circuit associated with each of the plurality of non-floating nets in the electronic circuit being equal to a sum of an associated row of the reduced capacitor matrix C_red in the electronic circuit.

5. The method according to claim 1, further comprising:
performing a timing study of at least a portion of the capacitor network including a plurality of non-floating nets in the electronic circuit based on the ground capacitance determined for each of the plurality of non-floating nets.

6. A computer program product comprising a computer storage device storing processor-executable code embodied therein to convert a capacitor network of an electronic circuit having floating nets and non-floating nets with mutual capacitances into a reduced capacitor matrix representing the capacitor network, the code comprising:
code associating each of a first plurality of mutual capacitances with two of a plurality of non-floating nets in a first matrix C1;
code associating each of a second plurality of mutual capacitances with one of the plurality of non-floating nets and one of a plurality of floating nets in a second matrix C2;
code associating each of a third plurality of mutual capacitances in the electronic circuit with two of the plurality of floating nets in a third matrix C3;
code to determine leading diagonal entries of a reduced capacitor matrix C_red for the electronic circuit,
wherein reduced matrix C_red=first matrix C1-transpose (second matrix C2)*inverse(third matrix C3)*second matrix C2; and
code to associate, for each of the plurality of non-floating nets in the electronic circuit, a ground capacitance in the electronic circuit with a non-floating net in the electronic circuit that is substantially equal to an associated leading diagonal entry and to a determined self-capacitance of the non-floating net.

7. The medium according to claim 6, wherein the code to determine the mutual capacitances in the electronic circuit among the plurality of floating nets in the electronic circuit and the plurality of non-floating nets in the electronic circuit comprises:
code to determine the first plurality of mutual capacitances in the electronic circuit between each of the plurality of non-floating nets in the electronic circuit and each other of the plurality of non-floating nets in the electronic circuit;
code to determine the second plurality of mutual capacitances in the electronic circuit between each of the plurality of non-floating nets in the electronic circuit and each of the plurality of floating nets in the electronic circuit; and
code to determine the third plurality of mutual capacitances in the electronic circuit between each of the plurality of floating nets in the electronic circuit and each other of the plurality of floating nets in the electronic circuit.

8. The computer program product according to claim 6, the code further comprising:
code to determine that a row size of the first matrix C1 is greater than a threshold number.

9. The computer program product according to claim 6, the code further comprising:
code to determine, if the row size of the first matrix C1 is less than the threshold number, all entries of the reduced capacitor matrix C_red for the electronic circuit, the ground capacitance in the electronic circuit associated with each of the plurality of non-floating nets in the electronic circuit being equal to a sum of an associated row of the reduced capacitor matrix C_red.

10. The computer program product according to claim 6, the code further comprising:
code to perform a timing study of at least a portion of the capacitor network including a plurality of non-floating nets in the electronic circuit based on the ground capacitance determined for each of the plurality of non-floating nets.

11. An apparatus for converting a capacitor network of an electronic circuit having floating nets and non-floating nets with mutual capacitances into a reduced capacitor matrix to represent the capacitor network in a computer storage device, comprising:
a processor; and
a storage device storing processor-executable code, the code executable by a processor to cause the apparatus to:
associate each of a first plurality of mutual capacitances with two of a plurality of non-floating nets in a first matrix C1;
associate each of a second plurality of mutual capacitances with one of the plurality of non-floating nets and one of a plurality of floating nets in a second matrix C2;
associate each of a third plurality of mutual capacitances in the electronic circuit with two of the plurality of floating nets in a third matrix C3;
determine leading diagonal entries of a reduced matrix C_red for the electronic circuit,
wherein reduced capacitor matrix C_red=first matrix C1-transpose(second matrix C2)*inverse(third matrix C3)*second matrix C2; and
associate, for each of the plurality of non-floating nets in the electronic circuit, a ground capacitance in the electronic circuit with a non-floating net in the electronic circuit that is substantially equal to an associated leading diagonal entry and to a determined self-capacitance of the non-floating net.

12. The apparatus according to claim 11, the code further executable by the processor to cause the apparatus to:
determine, if the row size of the first matrix C1 is less than the threshold number, all entries of the reduced capacitor matrix C_red, the ground capacitance associated with each of the plurality of non-floating nets being equal to a sum of an associated row of the reduced capacitor matrix C_red.

13. The apparatus according to claim 11, the code further executable by the processor to cause the apparatus to:
perform a timing study of at least a portion of the capacitor network including a plurality of non-floating nets in the electronic circuit based on the ground capacitance determined for each of the plurality of non-floating nets.

* * * * *